United States Patent
Raepple

(10) Patent No.: US 10,840,489 B2
(45) Date of Patent: Nov. 17, 2020

(54) ATTACHMENT DEVICE FOR ATTACHING AN ENERGY ACCUMULATOR TO AN UNDERBODY OF A MOTOR VEHICLE, AND MOTOR VEHICLE EQUIPPED THEREWITH

(71) Applicant: Bayerische Motoren Werke Aktiengesellschaft, Munich (DE)

(72) Inventor: Marcus Raepple, Walpertskirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/295,513

(22) Filed: Mar. 7, 2019

(65) Prior Publication Data
US 2019/0207181 A1 Jul. 4, 2019

Related U.S. Application Data

(63) Continuation of application No. PCT/EP2017/075108, filed on Oct. 4, 2017.

(30) Foreign Application Priority Data

Oct. 5, 2016 (DE) ........................ 10 2016 219 242

(51) Int. Cl.
 *B60K 1/04* (2019.01)
 *H01M 2/10* (2006.01)
(52) U.S. Cl.
 CPC ............. *H01M 2/1083* (2013.01); *B60K 1/04* (2013.01); *B60K 2001/0438* (2013.01); *B60Y 2410/125* (2013.01); *H01M 2220/20* (2013.01)

(58) Field of Classification Search
 CPC .. H01M 2/1083; H01M 2220/20; B60K 1/04; B60K 2001/0438; B60Y 2410/125
 See application file for complete search history.

(56) References Cited

U.S. PATENT DOCUMENTS

| 8,910,737 | B2 * | 12/2014 | Saeki ....................... B60K 1/04 180/68.5 |
| 10,173,511 | B2 * | 1/2019 | Hara ....................... B60L 50/66 |
| 2011/0000729 | A1 | 1/2011 | Schwarz et al. |

(Continued)

FOREIGN PATENT DOCUMENTS

| DE | 92 14 630 U1 | 2/1993 |
| DE | 10 2008 024 291 A1 | 11/2009 |

(Continued)

OTHER PUBLICATIONS

International Search Report (PCT/ISA/210) issued in PCT Application No. PCT/EP2017/075108 dated Nov. 22, 2017 with English translation (four (4) pages).

(Continued)

*Primary Examiner* — Bryan A Evans
(74) *Attorney, Agent, or Firm* — Crowell & Moring LLP

(57) ABSTRACT

For improved attachment of an energy accumulator to an underbody of a motor vehicle, an attachment device has a top side that is designed to be attached to the underbody via attachment fasteners and an underside that is designed to be connected to a top side of the energy accumulator. The underside of the attachment device and the top side of the energy accumulator are integrally bonded by an adhesive at least in a region remote from outer edges of the top side of the energy accumulator.

12 Claims, 3 Drawing Sheets

(56) References Cited

U.S. PATENT DOCUMENTS

2017/0305250 A1* 10/2017 Hara .................. H01M 2/1083
2018/0281577 A1* 10/2018 Acikgoez ................ F16F 15/04

FOREIGN PATENT DOCUMENTS

| DE | 10 2009 031 779 A1 | 1/2011 |
|----|--------------------|--------|
| DE | 10 2014 218 524 A1 | 3/2016 |
| DE | 10 2015 003 643 B3 | 6/2016 |
| DE | 10 2015 015 744 A1 | 6/2017 |
| JP | 2015-8161 A | 1/2015 |

OTHER PUBLICATIONS

German-language Written Opinion (PCT/ISA/237) issued in PCT Application No. PCT/EP2017/075108 dated Nov. 22, 2017 (seven (7) pages).

German-language Search Report issued in counterpart German Application No. 102016219242.6 dated Jun. 26, 2017 with partial English translation (12 pages).

\* cited by examiner

ATTACHMENT DEVICE FOR ATTACHING AN ENERGY ACCUMULATOR TO AN UNDERBODY OF A MOTOR VEHICLE, AND MOTOR VEHICLE EQUIPPED THEREWITH

CROSS REFERENCE TO RELATED APPLICATIONS

This application is a continuation of PCT International Application No. PCT/EP2017/075108, filed Oct. 4, 2017, which claims priority under 35 U.S.C. § 119 from German Patent Application No. 10 2016 219 242.6, filed Oct. 5, 2016, the entire disclosures of which are herein expressly incorporated by reference.

BACKGROUND AND SUMMARY OF THE INVENTION

The present invention relates to an attachment device for attaching an energy accumulator to an underbody of a motor vehicle and to a correspondingly equipped motor vehicle.

DE 10 2008 024 291 A1 discloses a motor vehicle to the underbody of which there can be attached an energy accumulator. The attachment is achieved by attachment means which are situated on the outer edge of the energy accumulator and are operatively connected to the latter and to the underbody. As is known, energy accumulators, in particular batteries, storage units and fuel cells, have a large weight, which means that it would be desirable, in particular to avoid an operationally and gravitationally induced bending of the energy accumulator in its central region as well as to increase the overall rigidity of the motor vehicle, for attachment of the energy accumulator also to be carried out at another point than its outer edge.

It is an object of the present invention to provide an attachment device by which the attachment of the energy accumulator to the underbody of a motor vehicle is improved in relation to the prior art.

This and other objects are achieved by one or more attachment devices for attaching an energy accumulator to an underbody of a motor vehicle in accordance with embodiments of the invention.

The attachment device according to the invention has an upper side and a lower side. The upper side of the attachment device is designed in such a way that it can be attached to the underbody by way of at least one attachment fastener. In a preferred manner, the attachment fastener is a releasable attachment fastener, in particular a screw, which is operatively connected to the underbody. In a preferred manner, a plurality of attachment fasteners are provided which are uniformly distributed over the surface region defined by the upper side of the attachment device, with the result that, with the energy accumulator mounted, the upper side of the attachment device is uniformly loaded.

The lower side of the attachment device is designed in such a way that it can be connected to the upper side of the energy accumulator. This connection is achieved by use of an adhesive which is arranged at least in a region remote from the outer edges of the upper side of the energy accumulator. The result is that the upper side of the energy accumulator and the lower side of the attachment device are integrally bonded to one another. It is therefore now also possible for the energy accumulator to be attached to the underbody at those points which were previously not accessible for attachment. Moreover, the attachment advantageously occurs in such a way that the inner structure of the energy accumulator and/or its structural integrity are or is uninfluenced. Thus, for improved attachment, it is in particular not required to provide attachment means guided through the energy accumulator, with the result that the capacity of the energy accumulator remains at a maximum owing to a lack of volume loss. Finally, the attachment device according to the invention has the advantage that any spacings or tolerances between the lower side of the attachment device and the upper side of the energy accumulator can be compensated for by the adhesive or said lower and upper sides can be connected to one another in a dimensionally stable manner.

As previously disclosed, the attachment devices are provided at least in a region remote from the outer edges of the upper side of the energy accumulator. In an advantageous manner, however, the attachment devices can also be provided up to the outer edges of the upper side of the energy accumulator. Alternatively or additionally, there can be provision to arrange releasable attachment fasteners, in particular screws, on the outer edges, said fasteners being operatively connected to the upper side of the energy accumulator and the lower side of the attachment devices. The adhesive itself can be provided here and there at discrete points or over large surface regions of the parts to be joined (lower side of the attachment devices and/or upper side of the energy accumulator).

It should be noted that the term "adhesive" used here is to be understood, in accordance with DIN EN 923, as meaning a nonmetallic material which connects the parts to be joined by surface adhesion and inner strength. In a particularly preferred manner, the adhesive is a polyurethane reactive adhesive (PUR) or a methacrylate adhesive. It should further be noted that the term "adhesive" used here in the singular also encompasses a plurality of adhesives; in particular, it is possible to provide different adhesives at different positions of the upper side of the energy accumulator or of the lower side of the attachment device.

The attachment device can be formed from any suitable material. Thus, it is possible in particular to produce it from the same material as the upper side of the energy accumulator. Independently thereof, the attachment device can be formed in particular from steel or a steel alloy, from aluminum or an aluminum alloy, or a plastic, preferably a fiber-reinforced plastic. The fiber material which can be used particularly takes the form of carbon fibers, glass fibers and/or aramid fibers, whereas a matrix surrounding them can consist of a polymer matrix.

According to a preferred embodiment, the lower side of the attachment device is formed parallel to the upper side of the energy accumulator. This allows a particularly secure connection of the stated elements by use of the adhesive.

This applies all the more if the attachment device is of planar design. In a particularly advantageous manner, the lower side of the attachment device has a surface which substantially corresponds to the surface of the upper side of the energy accumulator. An increase in the stiffness of the attachment device can be achieved in an advantageous manner through the arrangement of additional stiffeners, in particular ribs or beads.

According to a preferred embodiment, the lower side of the attachment device and the upper side of the energy accumulator are spaced apart from one another at the positions where adhesive is situated. This makes it possible for the energy accumulator to be demounted from the attachment device in an uncomplicated manner since the thus readily accessible adhesive can be severed in a simple manner, in particular by means of a wire.

The aforementioned object is also achieved by a motor vehicle having an underbody and an energy accumulator that comprises an attachment device of the previously disclosed type. The stated advantages apply appropriately. In a preferred manner, the motor vehicle is designed as a fully electric vehicle or hybrid vehicle.

The installation of an energy accumulator according to the invention during the production of a motor vehicle is advantageously possible in a simple manner and advantageously includes the following steps:
1. Providing a motor vehicle bodyshell having an underbody;
2. Attaching the upper side of one or more attachment devices to the underbody;
3. Finishing the motor vehicle body;
4. Providing and mounting the drive train and motor vehicle body ("marriage"); and
5. Providing an energy accumulator and attaching its upper side to the lower side of the underbody and of the attachment devices It should be noted that, in step 3., the installation of objects concerned with the internal fitting-out of the motor vehicle is encompassed. It is therefore advantageously possible to be able to attach the energy accumulator quickly and reliably to the motor vehicle if the latter is already finished in substantial part.

It should further be noted that the order of the aforementioned steps 4. and 5. can be swapped.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed, nonprejudicial, in particular nonlimiting, description of exemplary embodiments of the present invention is given below with reference to FIGS. 1 to 3. Like elements are provided with identical reference signs, unless stated otherwise.

Figure 1:
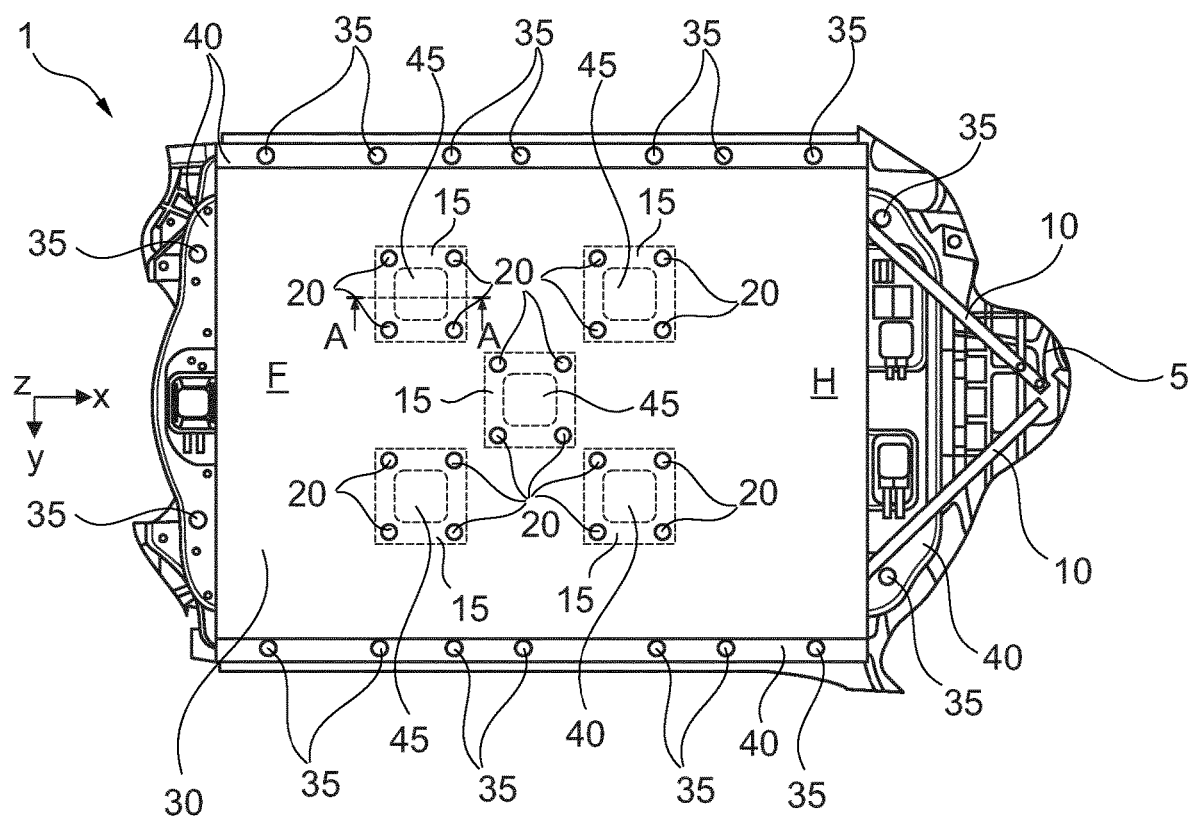
FIG. 1 is a schematic view of a partially illustrated motor vehicle from below to which an attachment device according to an embodiment of the invention, together with energy accumulator, is attached.

A motor vehicle 1 is shown partially in a bottom view in FIG. 1. The front region F of the motor vehicle 1 is situated on the left in FIG. 1, its rear region H being situated on the right. What is specifically shown is part of an underbody 5 which is reinforced by torsion struts 10 known per se.

A plurality of attachment devices 15 are mounted on the underbody 5 by means of a number of attachment fastener elements 20, screws according to this exemplary embodiment. The attachment devices 15 shown here are substantially formed in a plane which extends parallel to the underbody 5.

As viewed in the vehicle vertical axis (z direction), an energy accumulator 30 designed as a high-voltage accumulator is attached, below the attachment devices 15, to the underbody 5 by way of attachment elements 35. The attachment elements 35, screws in this exemplary embodiment, are situated on the outer edges 40 of the energy accumulator 30 and are operatively connected to the underbody 5. Moreover, adhesive 45 distributed over an upper surface of the energy accumulator 30 serves for attachment thereof to the attachment devices 15 in particular in those regions which are remote from the outer edges 40 and are not intended to be held by attachment elements (such as 35, which would interfere with the structure or integrity of the energy accumulator 30). As can be gathered from the exemplary embodiment shown here, five substantially square attachment element 15 and adhesive regions 45 are provided in the central region of the x-y plane defined by the energy accumulator 30. However, this is not absolutely necessary; rather, it is possible to provide the adhesive 45 and the attachment elements 15 in a different number, shape and/or position. Moreover, it is possible for the adhesive 45 to have identical or different material properties at various positions.

Figure 2:
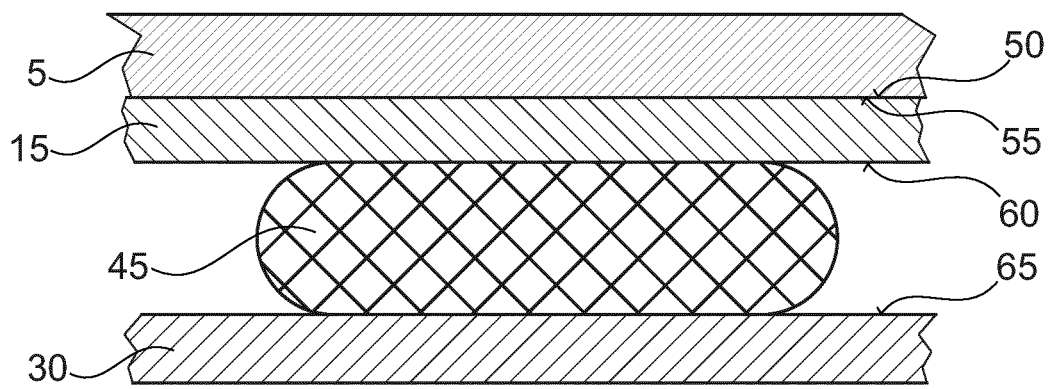
FIG. 2 is a schematic side view of a part of the arrangement shown in FIG. 1.

FIG. 2 corresponds to a section taken along the line A-A of FIG. 1 and represents, in a manner not true to scale, a part of the underbody 5, of the attachment device 15, of the adhesive 45 and of the energy accumulator 30 in the x-z plane. The lower side 50 of the underbody 5 and the upper side 55 of the attachment device 15 are adjacent to one another. The adhesive 45 is applied, on the one hand, to the lower side 60 of the attachment device 15 and, on the other hand, to the upper side 65 of the energy accumulator 30 in such a way that the attachment device 15 and the energy accumulator 30 are integrally bonded to one another.

Figure 3:
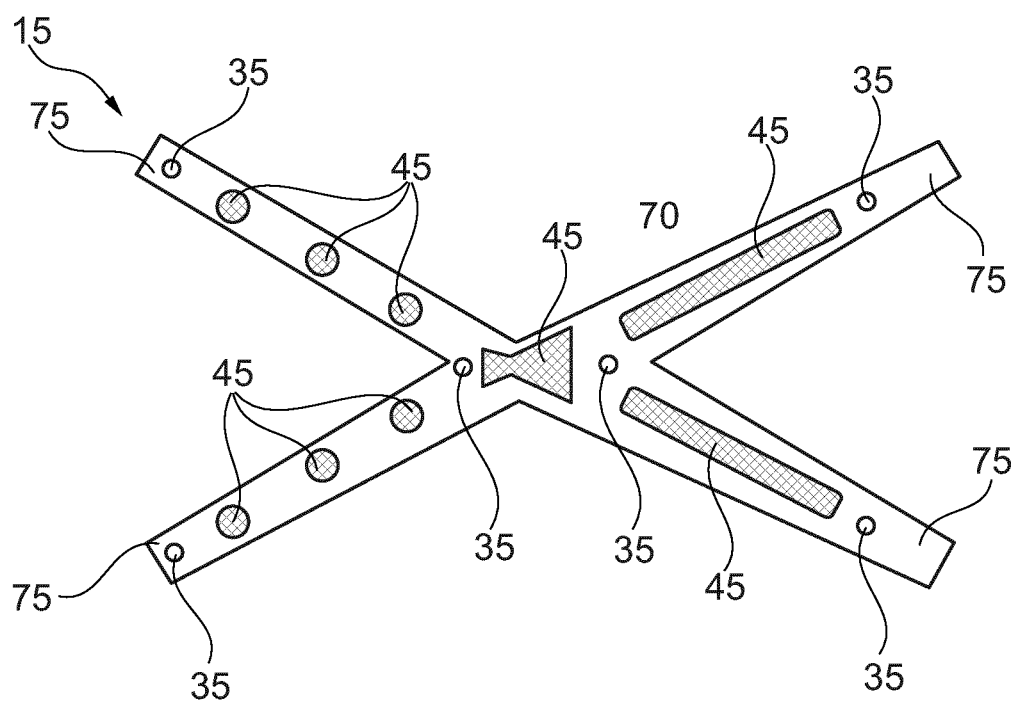
FIG. 3 is an alternative embodiment of an attachment device according to the invention in plan view.

FIG. 3 shows an alternative embodiment of the attachment device 15 in a bottom view. It is designed as a frame within which interconnected or integrally formed struts 75 have adhesive 45 at discrete points. As can be gathered from this figure, the adhesive has, depending on the point of application to the struts 75, a respectively different geometry in the x-y plane that influences its holding force. As a result, the fastening of the energy accumulator 30 can be optimized in a load-dependent manner and/or in terms of manufacture.

LIST OF REFERENCE SIGNS

1 Motor vehicle
5 Underbody
10 Torsion strut
15 Attachment device
20 Attachment fastener elements
30 Energy accumulator
35 Attachment fastener elements
40 Outer edges of the energy accumulator
45 Adhesive
50 Lower side of the underbody
55 Upper side of the attachment device
60 Lower side of the attachment device
65 Upper side of the energy accumulator
75 Struts
A-A Section line
F Front region of the motor vehicle
H Rear region of the motor vehicle
x, y, z Axes of a motor vehicle-specific Cartesian coordinate system known per se The foregoing disclosure has been set forth merely to illustrate the invention and is not intended to be limiting. Since modifications of the disclosed embodiments incorporating the spirit and substance of the invention may occur to persons skilled in the art, the invention should be construed

What is claimed is:

1. An attachment device for attaching an energy accumulator to an underbody of a motor vehicle, comprising:
   an upper side of the attachment device, which upper side is configured to be attached to the underbody via attachment fasteners;
   a lower side of the attachment device, which lower side is configured to be connected to an upper side of the energy accumulator; and
   an adhesive, wherein the lower side of the attachment device and the upper side of the energy accumulator are integrally bonded to one another by way of the adhesive at least in a region remote from outer edges of the upper side of the energy accumulator.

2. The attachment device as claimed in claim 1, wherein the lower side of the attachment device is formed parallel to the upper side of the energy accumulator.

3. The attachment device as claimed in claim 1, wherein the attachment device is of planar design.

4. The attachment device as claimed in claim 1, wherein the lower side of the attachment device and the upper side of the energy accumulator are spaced apart from one another at positions where the adhesive is situated.

5. The attachment device as claimed in claim 1, wherein the attachment device comprises a plurality of individual attachment devices having their upper sides attached to the underbody of the motor vehicle.

6. The attachment device as claimed in claim 1, wherein the attachment device comprises a single integral attachment device having the upper side thereof attached to the underbody of the motor vehicle.

7. A motor vehicle, comprising:
   an underbody;
   an energy accumulator; and
   an attachment device as claimed in claim 1.

8. The motor vehicle as claimed in claim 7, wherein the lower side of the attachment device is formed parallel to the upper side of the energy accumulator.

9. The motor vehicle as claimed in claim 7, wherein the attachment device is of planar design.

10. The motor vehicle as claimed in claim 7, wherein the lower side of the attachment device and the upper side of the energy accumulator are spaced apart from one another at positions where the adhesive is situated.

11. The attachment device as claimed in claim 1, wherein the attachment device is connected to the energy accumulator only on an area of the upper side that is away from the outer edges of the upper side of the energy accumulator.

12. The attachment device as claimed in claim 7, wherein the attachment device is connected to the energy accumulator only on an area of the upper side that is away from the outer edges of the upper side of the energy accumulator.

* * * * *